Figure 1:
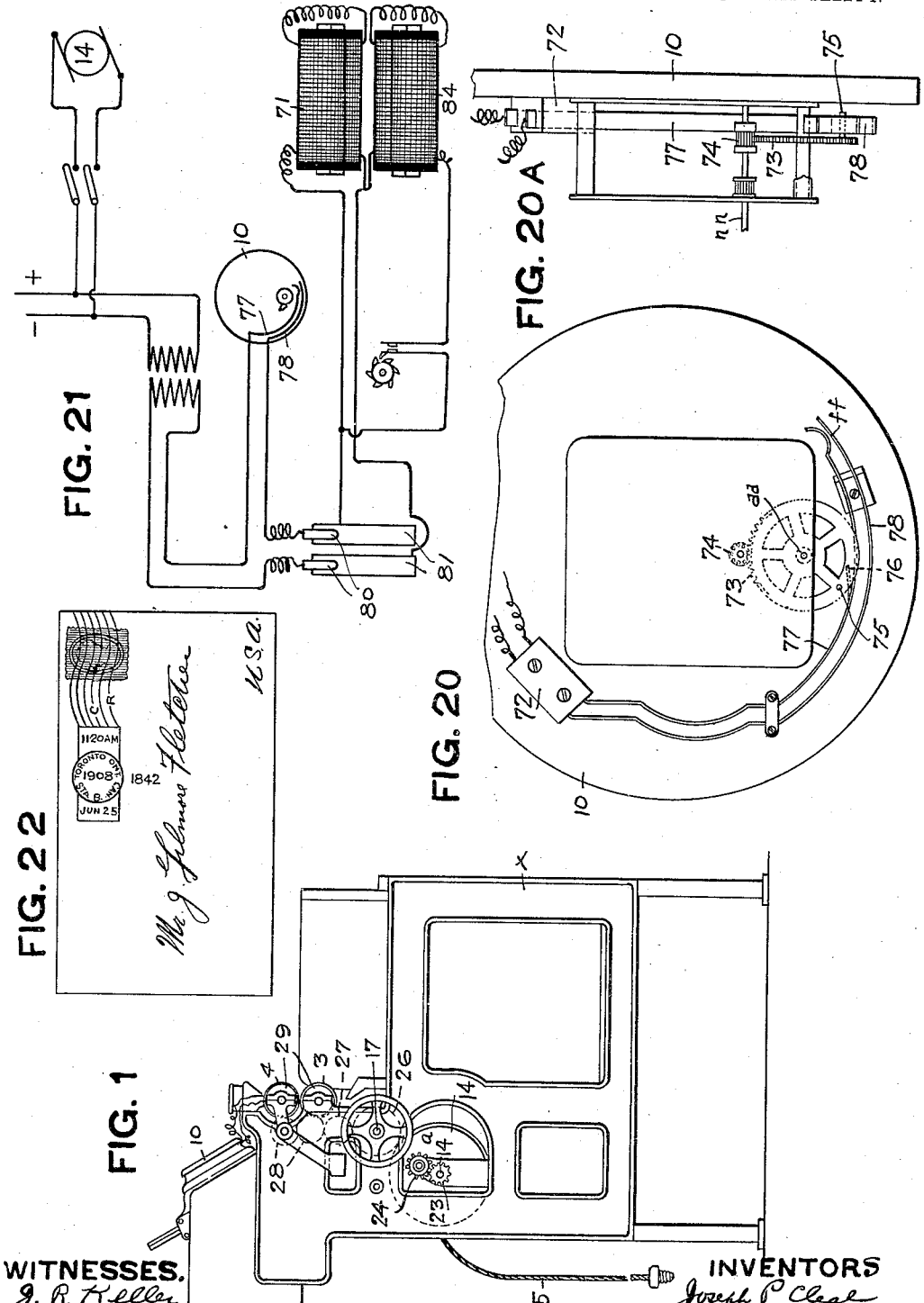

J. P. CLEAL & J. G. FLETCHER.
MACHINE FOR CANCELING MAIL MATTER.
APPLICATION FILED OCT. 23, 1908.

1,033,383.

Patented July 23, 1912.

4 SHEETS—SHEET 2.

WITNESSES.
J. R. Keller
Robert C. Totten

INVENTORS
Joseph P. Cleal
and James G. Fletcher
By Ray Totten attys

J. P. CLEAL & J. G. FLETCHER.
MACHINE FOR CANCELING MAIL MATTER.
APPLICATION FILED OCT. 23, 1908.

1,033,383.

Patented July 23, 1912.

4 SHEETS—SHEET 3.

WITNESSES.
J. R. Keller
Robt. C. Totten

INVENTORS
Joseph P. Cleal
and James G. Fletcher
By Kay & Totten
attys

J. P. CLEAL & J. G. FLETCHER.
MACHINE FOR CANCELING MAIL MATTER.
APPLICATION FILED OCT. 23, 1908.

1,033,383.

Patented July 23, 1912.

4 SHEETS—SHEET 4.

WITNESSES.
J. R. Keller
Robert C. Totten

INVENTORS
Joseph P. Cleal
James G. Fletcher
By Kay Totten
attys

COLUMBIA PLANOGRAPH CO., WASHINGTON, D. C.

UNITED STATES PATENT OFFICE.

JOSEPH P. CLEAL, OF TORONTO, ONTARIO, CANADA, AND JAMES G. FLETCHER, OF PITTSBURGH, PENNSYLVANIA.

MACHINE FOR CANCELING MAIL-MATTER.

1,033,383.

Specification of Letters Patent.   Patented July 23, 1912.

Application filed October 22, 1908.   Serial No. 459,227.

*To all whom it may concern:*

Be it known that we, JOSEPH P. CLEAL, a resident of Toronto, in the Province of Ontario, Canada, and JAMES G. FLETCHER, a resident of Pittsburgh, county of Allegheny, and State of Pennsylvania, have invented a new and useful Improvement in Machines for Canceling Mail-Matter; and we do hereby declare the following to be a full, clear, and exact description thereof.

Our invention relates to time stamp mechanism adapted for use in connection with machines for marking mail matter.

Among the objects of our invention may be said to be the provision of means electrically controlled to automatically operate the different parts of the printing mechanism making it possible to operate the machine for one month with one setting and with no other attention than the winding of a clock once in twenty-four hours.

A further object of our invention is to so arrange the mechanism that nothing has to be removed or added in the resetting of the printing device once each month and that the setting mechanism shall be a fixed part of the machine itself arranged to be easily reached and manipulated.

With these objects in view the invention consists in certain novel features of construction and combination of parts the essential elements of which are set forth and shown in the drawings which accompany and form part of this specification.

Figure 2:
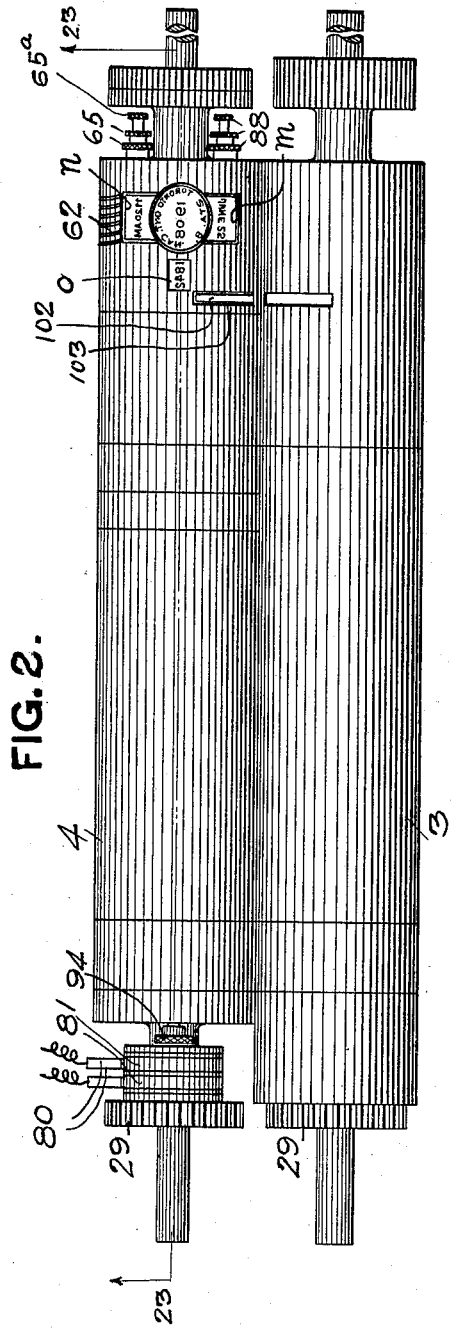
Figure 3:
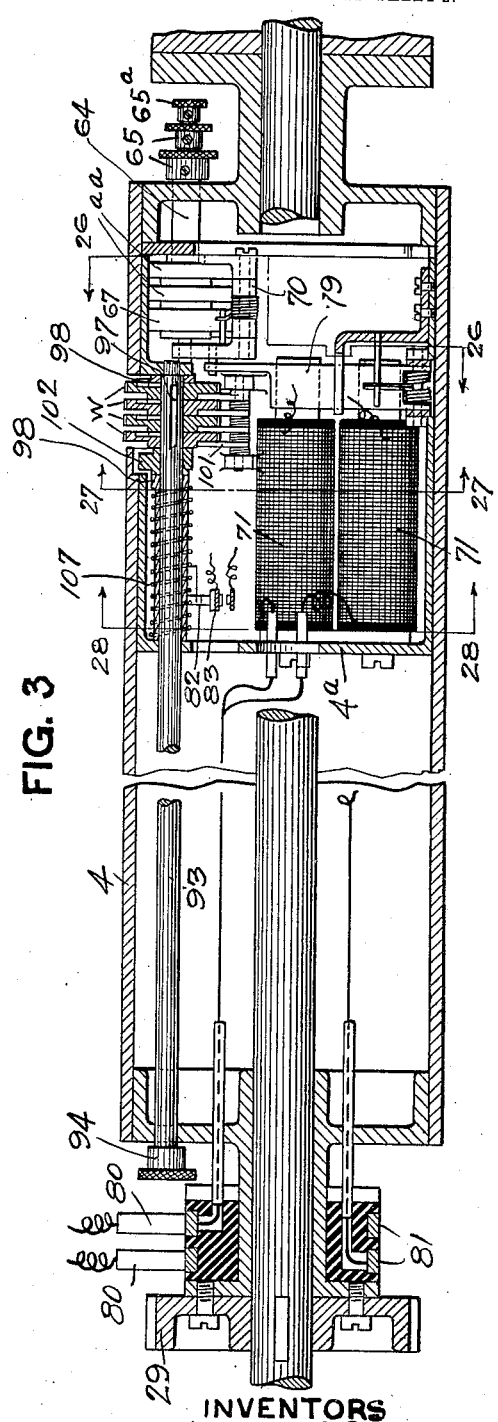
Figure 4:
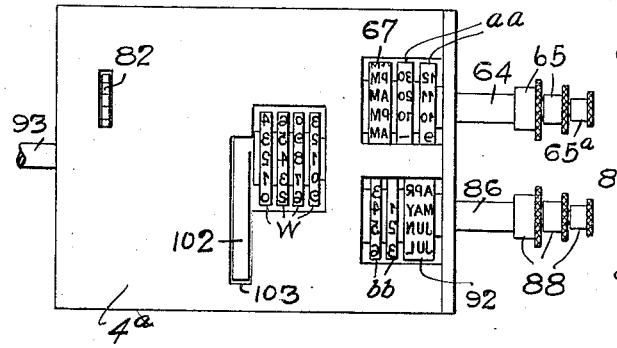
Figure 6:
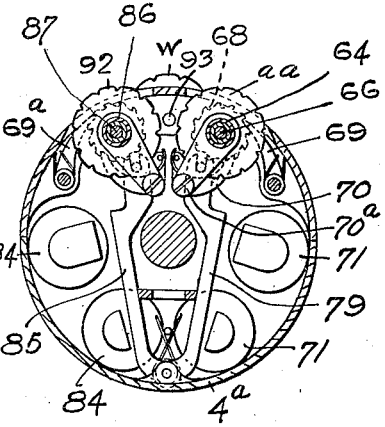
Figure 5:
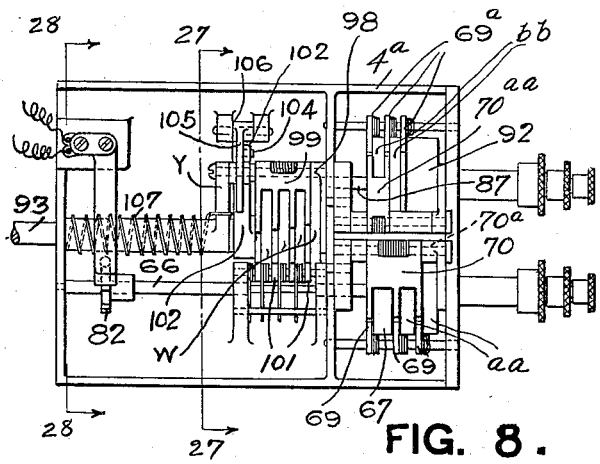
Figure 7:
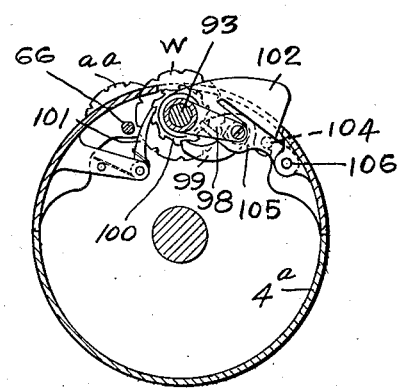
Figure 8:
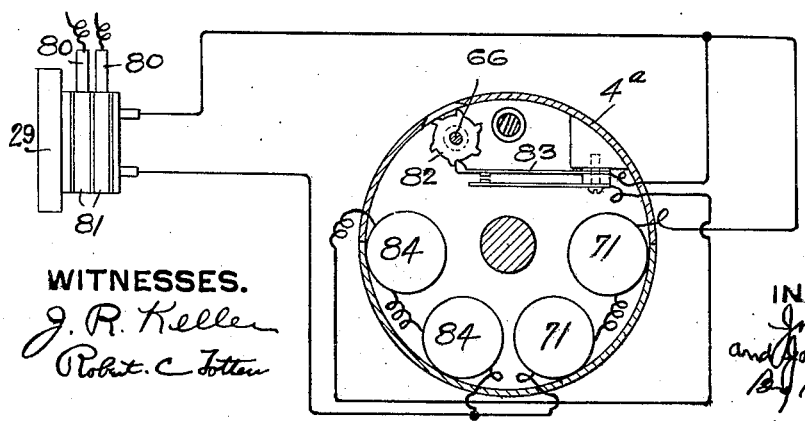
Figure 10:
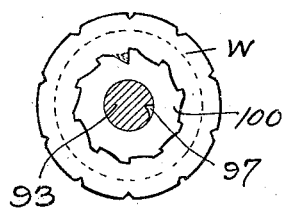
Figure 9:
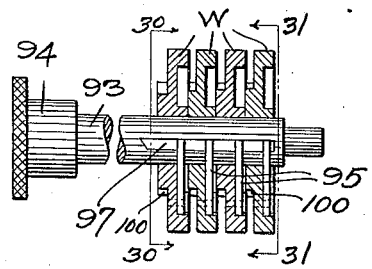
Figure 11:
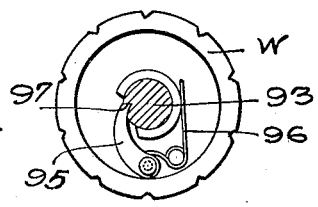
Figure 12:
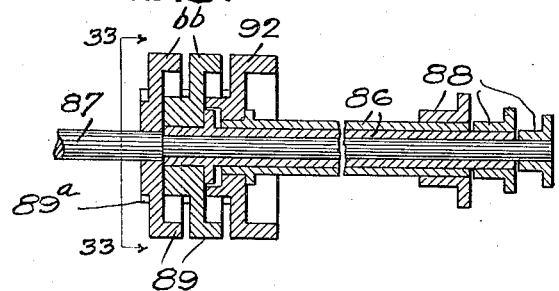
Figure 13:
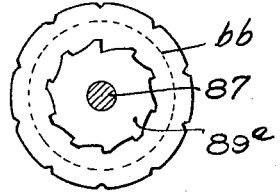
Figure 14:
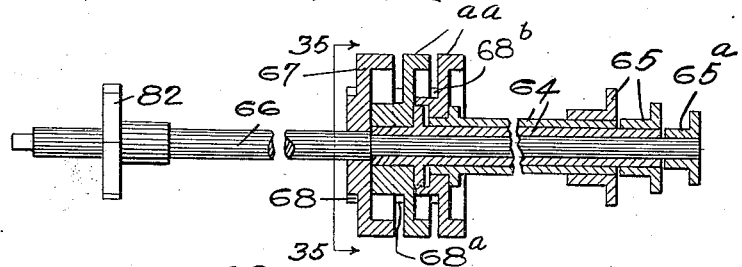
Figure 15:
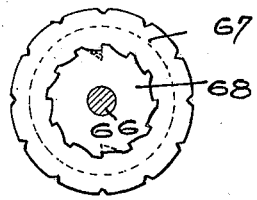
Figure 16:
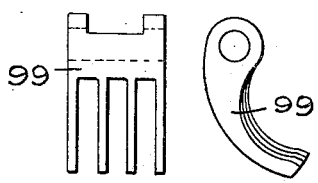
Figure 17:
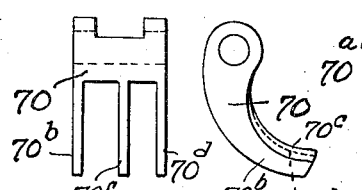
Figure 18:
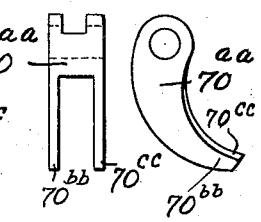
Figure 19:
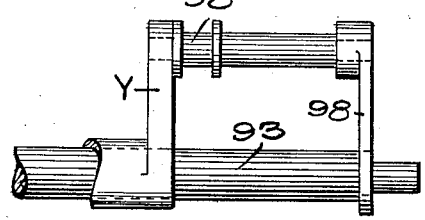

In the drawings Figure 1 is a side elevation of a mail canceling machine showing our invention as applied thereto. Fig. 2 is a plan view of the printing rolls. Fig. 3 is a longitudinal vertical section through the printing roll on the line 23—23 Fig. 2. Fig. 4 is a plan view of the printer wheel frame. Fig. 5 is an inverted plan view of the printer wheel frame and all its parts. Figs. 6 and 7 are sections through the printer wheel taken on the lines 26—26 and 27—27. Fig. 8 is a part section and part diagram, the section being taken on the line 28—28 Fig. 3 illustrating the printing roll armature and magnet wiring. Figs. 9, 10 and 11 are detail views of the consecutive numbering shaft and printing wheel showing the printing wheel resetting pawl. Figs. 12 and 13 are detail views of the date printing wheels showing detail of the nest resetting tubes. Figs. 14 and 15 are details of the time printing wheels showing detail of the resetting tubes and date contact wheel. Fig. 16 is a detail view of the consecutive number printing wheel operating pawl. Fig. 17 is a detail of the time printing wheel operating pawl. Fig. 18 is a detail of the printing wheel operating pawl. Fig. 19 is a detail plan view of the consecutive number printing wheel operating pawl shaft links. Fig. 20 is a plan view of the mechanism for showing the time in seconds in the clock together with the additional mechanism for making and breaking the printer roll magnet current every 10 minutes. Fig. 20ª is a side view of the same. Fig. 21 is a chart showing the wiring used when the machine is driven by an alternating current motor. Fig. 22 shows an envelop which has been acted on by our improved apparatus.

In Fig. 1 we have shown a mail canceling machine to which our invention is applicable although its use is not limited to such machine. The letter *x* represents a suitable stand or frame for supporting the several parts of our improved apparatus. The printing rolls 3 and 4 are arranged one above the other, one of said rollers 3 being stationary and adapted to rotate in suitable bearings in the frame. The power to drive the printing rolls may be obtained from a suitable motor 14 with the motor power cord 15 having a contact plug at its extreme end which may be inserted in an ordinary wall socket. The motor shaft 14ª has the pinion 23 which meshes with the pinion 24 and the pinion 24 meshes with the clutch gear 25 together with its attendant parts running loosely on the power shaft 17. The gear wheel 26 on the shaft 17 meshes with the pinion 27. The pinions 28 are driven by the pinion 27 and said pinions 28 in turn drive the pinions 29 made fast to the printing rolls 3 and 4. The printing rolls 3 and 4 are made hollow and the ends plugged in such a manner as to admit of shafts being passed through holes in the plugs concentric with the periphery of the printing rolls. The printing roll 4 contains the sub-case 4ª which is inserted within said roll, and said sub-case contains the printing mechanism for printing the changeable time designating marks. This device is so constructed as to cause the printing wheels to protrude through openings in the printing roll 4 of which $m$ is the date opening, $n$ the time opening, and $o$ the consecutive number opening, as shown in Fig. 2, the printing wheel protruding as shown in Fig. 3. The time printing wheels $a$—$a$ protruding through the opening $n$ are moved every 10 minutes and they are reset or returned to their initial position by the nested tubes 64 at one end of which the printing wheels are fastened. To the other end of the tubes are fastened the turn back knobs 65. These tubes 64 are nested from the shafts 66. A turn back knob $65^a$ is attached to the shaft 66 for turning the same. The ratchet wheels 68, $68^a$, and $68^b$, are attached to each of the printing wheels $a$—$a$ and said ratchet wheels have each 12 notches formed therein. The ratchet wheel $68^a$ has two deep notches and the wheel $68^b$ one deep notch formed therein, the notches of $68^a$ being slightly deeper than the notch of $68^b$, as shown in dotted lines Fig. 15. The retainer pawl 69 enters the teeth of the ratchets and rests therein in such a manner as to keep the figure desired to be printed exposed through the opening and prevents the back movement of the ratchets. The driving pawl 70 on the shaft $70^a$ has three prongs $70^b$, $70^c$, and $70^d$ (see Fig. 17) and said pawl at each forward impulse moves the ratchet 68 and time printing wheels $a$—$a$ forward one notch. The prong which engages the ratchet $68^a$ is slightly higher than the prong engaging the ratchet $68^b$. On the twelfth movement the prongs $70^c$ and $70^d$ of the pawl 70 drop into the ratchets of the top notches $68^a$ and $68^b$, as far as it is allowed to do so, but the next succeeding ratchet which, if it happens to be standing at a shallow notch will actually move two wheels. If, however, the top notches of the wheels $68^a$ and $68^b$ should be in alinement with one another of three prongs of the driving pawl 70 would act on their respective ratchets, turning said ratchets and their attendant printing wheels $a$—$a$ one notch.

It will thus be understood that the movement of the wheel printing the minutes will move one notch each 10 minutes causing its attendant printing wheel to print the proper designating number. The ratchet of the wheel printing the hours will move one tooth each hour and as a consequence when the minute ratchet has moved six notches a movement of one notch will be imparted to the hour ratchet. Furthermore when the hour ratchet has made a complete revolution a movement of one tooth will be imparted to the ratchet 67 to change from A. M. to P. M. Accordingly the deep notch in the minute ratchet will be the sixth notch, as shown in dotted lines Fig. 15. When the pawl $70^c$ of the minute ratchet $68^a$ drops into one of the top notches of said ratchet, the next prong $70^d$ of the pawl 70 will drop into a shallow tooth of the hour ratchet $68^b$ and both the minute and hour ratchets will be moved by the next operation of the pawl. In this manner one complete revolution of the minute ratchet will move the hour ratchet two teeth. When the ratchets have been turned in this manner during the twelve hours, at the end of the twelfth the deep notches of the ratchets $68^a$, $68^b$, will be in alinement with each other and as a consequence the three prongs of the pawl 70 will be in engagement each with its respective ratchet and all three ratchets or wheels will be moved at once. After this united movement of the ratchets the longest pawl of the ratchets or the one engaging the minute ratchet will engage a shoulder tooth on the minute ratchet and the other prongs will remain out of engagement with their ratchets until one of said prongs drops into a deep notch whereupon all of the wheels will be operated. We prefer to operate these printing wheels electrically and accordingly we have illustrated in Fig. 8 a chart of the wiring contained in the printing roll 4 and the armature contacts. The clock 10 is placed in a convenient part of the machine and is arranged with an electrical circuit breaker 72 to operate every ten minutes (see Fig. 20) which is wired to the main line and consists of suitable parts properly installed to make and break the magnetic circuit at a pre-determined time and in the following manner: The gear 73 with its attendant pinion shaft is mounted in the clock frame at $d$—$d$ and is driven by a small pinion 74 situated on the trunnion of the second hand of the clock. The said second hand and pinion 74 turn the gear 73 one complete revolution every ten minutes. When the gear 73 is fastened to a stud 75, which, as the gear 73 revolves is brought into contact with the projection 76 made fast to contact piece 77 forcing it outward as to make it touch contact piece 78 at $f$—$f$. All of the above description is shown in Figs. 20 and $20^a$ in which $n$—$n$ represents the second hand trunnion. All the parts of the clock are omitted except those necessary to illustrate the device we are describing. It will be understood that the closing of the contact pieces 77 and 78 actuates the magnet 71, Fig. 6, and this magnet, which is of the horse-shoe type, actuates the armature 79, which in turn actuates the printing wheels $a$—$a$ as previously described. The current is carried along the wires from the clock as illustrated in the drawing and the wiring can be followed by referring to the wiring chart Fig. 21. Fig. 21 is a chart for the alternating current showing the transformer in line to transform an alternating current to a direct current for the use of the magnets. Where the alternating current is employed the current passes through the transformer into the clock and into the armature brushes 80 and thence through the armature 81, the construction of which is shown in Fig. 3, the current passing in the direction of the arrow.

Mounted on the shaft 87 are the date printing wheels $b$—$b$ which are arranged upon the nested tubes 86 on said shaft. Turn-back knobs are secured to the nested tubes and to the shaft 87. It will be observed that the primary date wheel will be moved only once every twelve hours and accordingly after the second operation of the A. M. and P. M. printing wheel 67. Accordingly the date printing wheel 89 has a ten toothed ratchet $89^a$ made fast to it, which ratchet has one deep tooth which causes the primary wheel to transfer to the secondary wheel at the end of ten days, the driving pawl $70^a$—$^a$, in this case having but two prongs $70^b$—$^b$ and $70^c$—$^c$. The retaining pawl $69^a$ is the same as that employed above. As above described the A. M. and P. M. wheels 67 are moved every twelve hours and in order to move the date printing wheel every twenty-four hours, the star wheel 82 on the shaft 66 acts on the contact piece 83, Fig. 8, which causes the magnet 84 to actuate its armature 85, which in turn, operates the pawl $70^a$—$^a$ to move the printing wheels $b$—$b$. The primary date printing wheel is rotated once every twenty-four hours until the tenth day, whereupon the second prong of the pawl $70^a$—$^a$ will drop into the top notch of the ratchet and carry the second wheel forward one notch. A month printing wheel 92 is set once each month by its respective turn-back knob 88. The consecutive numbering device, Figs. 9, 10 and 11, consist of four printing wheels arranged on the end of shaft 93 upon which they work freely. On the opposite end of the shaft 93 is the turn-back knob 94 and at the end occupied by the wheel $w$ is a spline to receive the end of the turn-back pawl 95, the point of which is held in position by the spring 96. This spring presses against the turn-back pawl and allows the printing wheels $w$ to turn in the proper direction to print and if the turn-back knob is turned in the same direction, it causes the spline 97 to pick up the printing wheel and turn it back to zero. To accomplish this the spline 97, which is intended to turn the printing wheel $w$ back to its initial position must be straight to catch the end of the pawl as shown in Fig. 11. The bottom of this spline must diverge from the bottom of the wall at such an angle that it will not interfere with the pawl when the wheel is turned in the direction to print, thus allowing the pawl to trail without catching in the shaft.

Where our invention is employed in connection with a mail canceling machine, suitable feeding mechanism will be provided for feeding the mail matter to the printing rolls and to stop and start the machine in a given fixed position.

What we claim is:

1. In mail marking apparatus, the combination of a suitable frame, a power shaft, feeding and marking rolls operated thereby, clock mechanism, a primary printing unit consisting of a plurality of rotary wheels carrying designating marks, a ratchet, a pawl, mechanism for operating said wheels, an armature connected to said ratchet, a pawl mechanism, a secondary printing unit consisting of a plurality of rotary wheels carrying designating marks, ratchet and pawl mechanism for operating said wheels, an armature connected to said ratchet and pawl mechanism, a double set of magnets carried by said last named roll one for each printing unit, and means independent of said clock mechanism intermediate said primary and said secondary printing units for energizing said secondary printing unit magnets at pre-determined intervals of time.

2. In mail marking apparatus, the combination with a suitable frame, of separately and simultaneously actuated primary and secondary printing units mounted on parallel shafts, a plurality of rotary wheels on each unit having designating marks thereon, ratchet wheels having a specified number of teeth, pawls engaging said ratchet wheels, said pawls being of different lengths, one or more of said wheels having deep notches adapted to be engaged by said pawls and clock mechanism for controlling said mechanism.

3. In mail marking apparatus, the combination with a suitable frame, of a power shaft, rolls operated thereby, clock mechanism, primary and secondary printing units mounted on two parallel shafts each containing a plurality of rotary wheels carried by one of said rolls, said wheels having designating marks thereon, ratchet wheels having a specified number of teeth, one ratchet made fast to the shaft which carries the primary printing unit and pronged wheel on said shaft, a flexible element operated by the said pronged wheel to control the action of the secondary printing unit, a pawl having fingers of different lengths corresponding to the number of wheels, one or more of said wheels having deep notches adapted to be engaged by said fingers, and means for operating said pawl by said clock mechanism at pre-determined periods.

4. In mail marking apparatus, the combination with a suitable frame, of a power shaft, rolls operated thereby, clock mechanism, primary and secondary printing units mounted on two parallel shafts each containing a plurality of rotary wheels carried by one of said rolls, said rolls having designating marks thereon, a ratchet on each of said wheels, a pawl common to all of said ratchets, a magnet for operating said pawl, means for energizing said clock mechanism at pre-determined periods, and independent means for causing simultaneous action of the primary and secondary printing units.

5. In mail marking apparatus, the combination of a suitable frame, of a power shaft, rolls operated thereby, clock mechanism, primary and secondary printing units, mounted on two parallel shafts, each containing a plurality of rotary printing wheels carried by one of said rolls, ratchet wheels having a specified number of teeth, a pawl for each printing unit, having fingers corresponding to the number of said wheels, one or more of said wheels having deep notches adapted to be engaged by said fingers on said pawl, a magnet for operating said pawl, means for energizing said magnet by said clock mechanism, at pre-determined periods, and independent means for causing simultaneous action of the primary and secondary printing units at pre-determined intervals of time.

6. In mail marking apparatus, the combination with a suitable frame, of a shaft, a plurality of rotary printing wheels on said shaft carrying designating marks, ratchet and pawl mechanism for operating said wheels, one wheel and its ratchet made fast to said shaft, a pronged wheel on said shaft, a flexible unit operated by said pronged wheel, a second shaft, a plurality of rotary printing wheels on said second shaft carrying designating marks, ratchet and pawl mechanism governed by the movement of said flexible unit for operating said wheels, clock mechanism, connections independent of said clock mechanism interposed between said first named shaft and said second shaft, and means for operating said first shaft by said clock mechanism.

7. In mail marking apparatus, the combination with a suitable frame, of a shaft, a plurality of rotary printing wheels on said shaft carrying designating marks, ratchet and pawl mechanism for operating said wheels, clock mechanism, a magnet operating said ratchet and pawl mechanism, means for energizing said magnet by said clock mechanism at pre-determined periods, a second shaft in said roll, a plurality of rotary printing wheels on said shaft carrying designating marks, ratchet and pawl mechanism governed by the movement of said flexible unit for operating said wheels, a magnet for operating said ratchet and pawl mechanism, and connections independent of said clock mechanism interposed between said first named shaft and said second shaft for energizing said second magnet.

8. In mail marking apparatus, the combination with a suitable frame, of a power shaft, rolls operated thereby, a clock mechanism, a shaft in one of said rolls, a plurality of rotary printing wheels on said shaft carrying designating marks, ratchet and pawl mechanism for operating said wheels, means for operating said rotary printing wheels by said clock mechanism at pre-determined periods, a second shaft in said roll, a plurality of rotary printing wheels on said shaft carrying designating marks, ratchet and pawl mechanism for operating said wheels, and connections between said first named shaft and said second shaft.

9. In mail marking apparatus, the combination of a suitable frame, a power shaft, rolls operated thereby, a clock mechanism, a shaft in one of said rolls, a plurality of rotary printing wheels on said shaft carrying designating marks, ratchet and pawl mechanism for operating said wheels, a magnet operating said ratchet and pawl mechanism, means for energizing said magnet by said clock mechanism at predetermined periods, a second shaft in said roll, a plurality of rotary printing wheels on said shaft carrying designating marks, ratchet and pawl mechanism, for operating said wheels a magnet for operating said ratchet and pawl mechanism, and connections between said first named shaft in said roll and said second shaft for energizing said second magnet.

10. In mail marking apparatus, the combination with a suitable frame, of a power shaft, rolls operated thereby, clock mechanism, a shaft in one of said rolls, a plurality of rotary printing wheels on said shaft carrying designating marks, ratchet and pawl mechanism for operating said wheels, means for operating said ratchet and pawl mechanism by said clock mechanism at pre-determined periods, a second shaft in said roll, a plurality of rotary printing wheels on said shaft carrying designating marks, ratchet and pawl mechanism for operating said wheels, and means independent of said clock mechanism for operating said last named ratchet and pawl mechanism upon a partial rotation of said first named shaft.

11. In mail marking apparatus, the combination with a suitable frame, of a power shaft, rolls operated thereby, clock mechanism, a shaft in one of said rolls, a plurality of rotary printing wheels on said shaft carrying designating marks, ratchet and pawl mechanism for operating said wheels, a magnet operating said ratchet and pawl mechanism, means for energizing said magnet by said clock mechanism at pre-determined periods, a second shaft in said rolls, a plurality of rotary printing wheels on said shaft carrying designating marks, ratchet and pawl mechanism for operating said wheels, a magnet for operating said ratchet and pawl mechanism upon the partial rotation of said first named shaft.

12. In mail marking apparatus, the combination with a suitable frame, of a power shaft, rolls operated thereby, clock mechanism, a shaft in one of said rolls, a plurality of rotary printing wheels on said shaft carrying designating marks, ratchet and pawl mechanism for operating said wheels, a magnet operating said ratchet and pawl mechanism, means for energizing said magnet by said clock mechanism at pre-determined periods, a second shaft in said roll, a plurality of rotary printing wheels on said shaft carrying designating marks, ratchet and pawl mechanism for operating said wheels, a magnet for operating said ratchet and pawl mechanism, a wheel on said first named shaft, and means for completing the circuit to said last named magnet to energize the same.

13. In mail marking apparatus, the combination with a suitable frame, of a power shaft, rolls operated thereby, a removable sub-case in one of said rolls, a shaft in said removable sub-case, a plurality of rotary printing wheels on said shaft carrying designating marks, ratchet and pawl mechanism for operating said wheels, a magnet operating said ratchet and pawl mechanism, clock mechanism, means for energizing said magnet by said clock mechanism at pre-determined periods, a second shaft in said removable sub-case, a plurality of rotary printing wheels on said second shaft carrying designating marks, ratchet and pawl mechanism for operating said wheels, a magnet for operating said ratchet and pawl mechanism, a wheel on said first named shaft, and means for completing the circuit to said last named magnet to energize the same.

14. In mail marking apparatus, the combination with a suitable frame, of a roll, a roll, a shaft working in said roll, a plurality of wheels thereon, one of which is made fast to the shaft and all carrying designating marks and free to turn independently in one direction, a ratchet and pawl mechanism for moving said wheels, clock mechanism, a second shaft carrying designating marks and free to turn independently in one direction, ratchet and pawl mechanism correlative with said wheels, means dependent upon the movement of said first named shaft for automatically operating said ratchet and pawl to move said wheels on said second shaft, and independent mechanical means for setting and re-setting each wheel.

In testimony whereof, we the said JOSEPH P. CLEAL and JAMES G. FLETCHER have hereunto set our hands.

JOSEPH P. CLEAL.
JAMES G. FLETCHER.

Witnesses:
G. F. FLETCHER,
R. S. CHILTON, Jr.

---

Copies of this patent may be obtained for five cents each, by addressing the "Commissioner of Patents, Washington, D. C."